(12) United States Patent
Burgess et al.

(10) Patent No.: US 7,371,009 B1
(45) Date of Patent: May 13, 2008

(54) SPLIT GIB MOUNTING ARRANGEMENT FOR DRILLING COMPONENTS

(75) Inventors: Timothy D. Burgess, South Point, OH (US); Ward D. Morrison, Claremont, NH (US)

(73) Assignee: J.H. Fletcher & Co., Huntington, WV (US)

( * ) Notice: Subject to any disclaimer, the term of this patent is extended or adjusted under 35 U.S.C. 154(b) by 273 days.

(21) Appl. No.: 11/167,328

(22) Filed: Jun. 27, 2005

Related U.S. Application Data

(60) Provisional application No. 60/584,212, filed on Jun. 30, 2004, provisional application No. 60/587,741, filed on Jul. 14, 2004.

(51) Int. Cl.
*F16C 29/02* (2006.01)
(52) U.S. Cl. .......................................... 384/39; 384/42
(58) Field of Classification Search .................. 384/7, 384/26, 30, 31, 35, 39, 41, 42, 55, 59
See application file for complete search history.

(56) References Cited

U.S. PATENT DOCUMENTS

| | | | |
|---|---|---|---|
| 1,831,445 A | * | 11/1931 | Hansen ........................ 384/42 |
| 1,981,992 A | | 11/1934 | Curtis |
| 2,049,394 A | | 7/1936 | Johnson |
| 3,650,576 A | | 3/1972 | Hughes |
| 4,566,738 A | | 1/1986 | Fasth |
| 4,682,899 A | | 7/1987 | Andersson et al. |
| 4,925,320 A | | 5/1990 | Foster et al. |
| 5,330,012 A | | 7/1994 | Morrison |
| 5,704,716 A | | 1/1998 | Jantunen |
| 5,988,298 A | * | 11/1999 | Cheng et al. ................ 173/147 |

FOREIGN PATENT DOCUMENTS

| | | | |
|---|---|---|---|
| DE | 3423390 A1 | * | 1/1986 |
| DE | 4118479 | | 1/1992 |
| SE | 7707140 | | 9/1978 |
| WO | WO 94/07000 | | 3/1994 |

OTHER PUBLICATIONS

"Hydraulic boom BUT 30/35 Direct positioning boom for accurate, fast and simple manoeuvring," Atlas Copco, 3pps.

* cited by examiner

*Primary Examiner*—Thomas R. Hannon
(74) *Attorney, Agent, or Firm*—King & Schickli, PLLC

(57) ABSTRACT

Apparatus and methods are provided for assisting in mounting a wear pad to a drilling machine. A gib is split longitudinally into at least first and second portions creating a channel for receiving the wear pad. A portion of the wear pad may include a tenon, such as a dovetail, corresponding to the channel, or mortise. A fastener may be used to fasten the first and second portions of the gib together. In this configuration, the wear pad may be removed in a longitudinal direction or otherwise by separating the first and second portions of the gib.

16 Claims, 6 Drawing Sheets

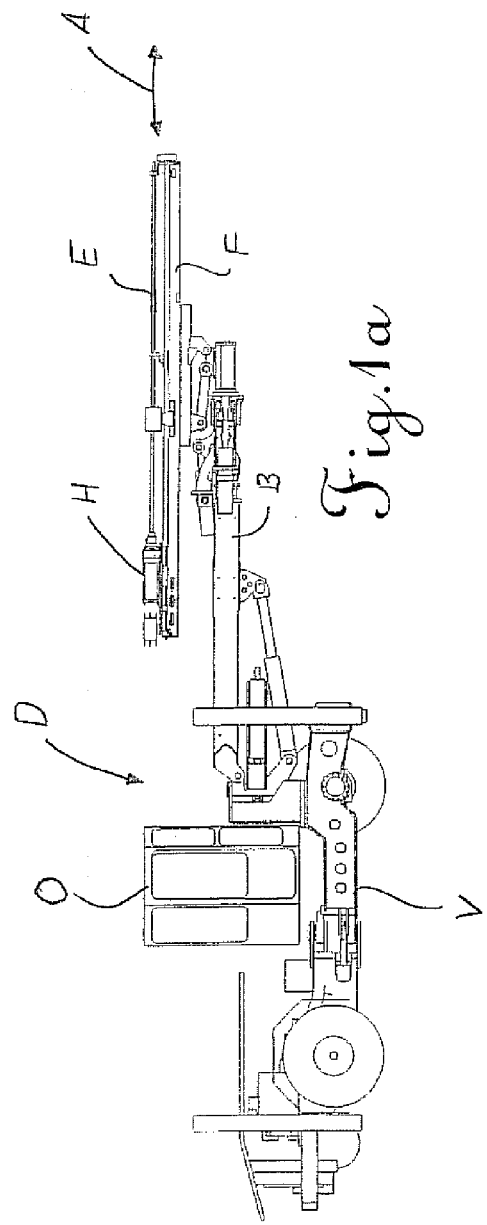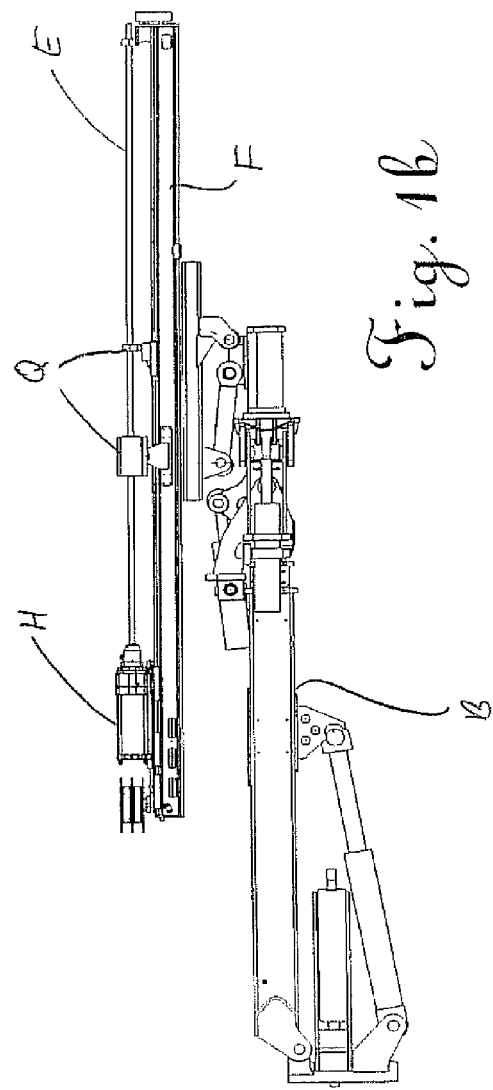

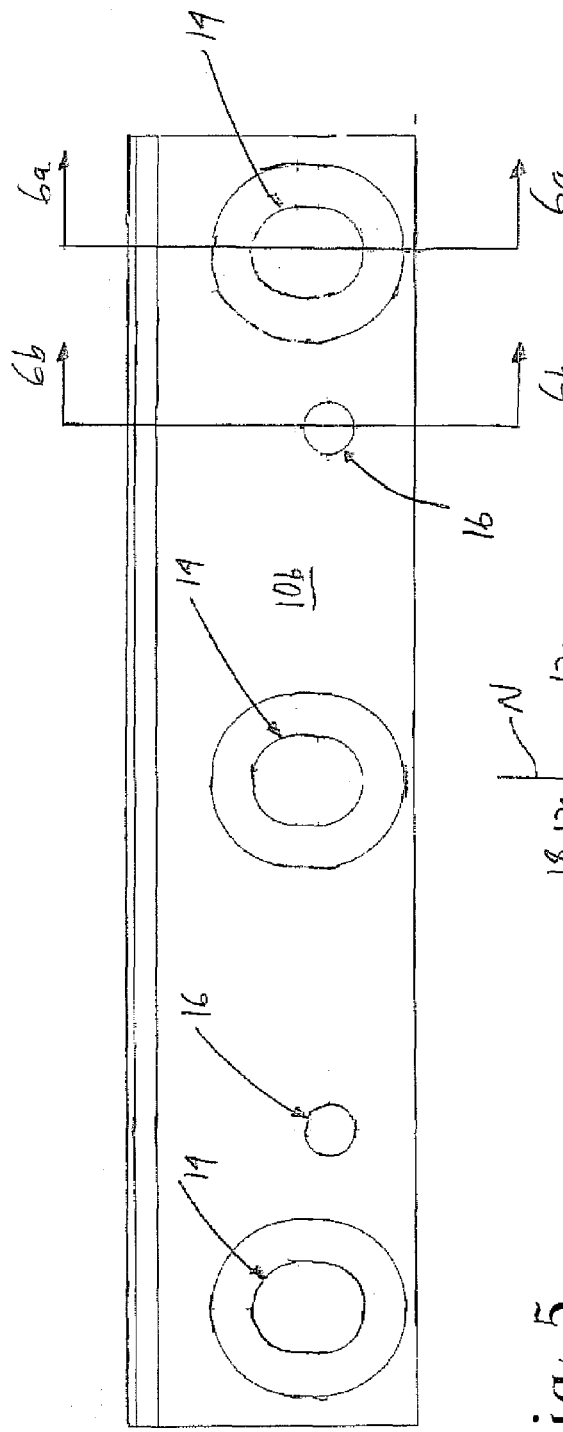
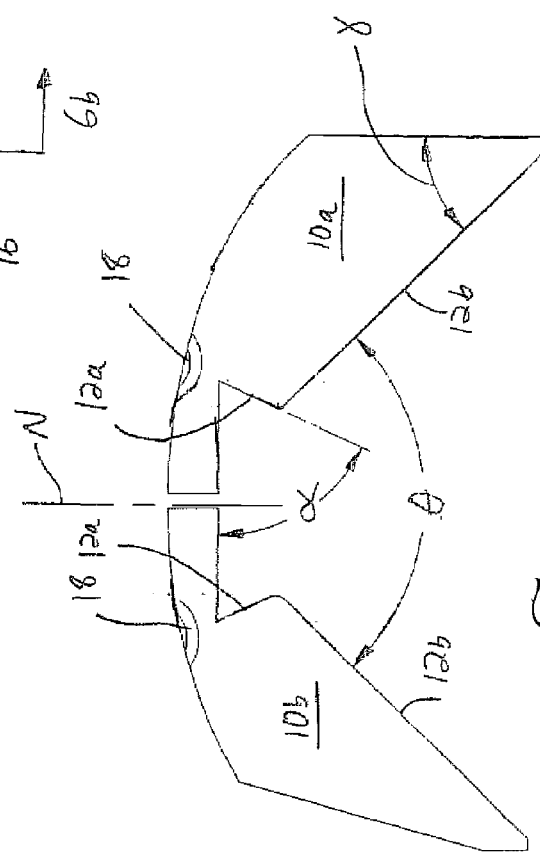
Fig. 5
Fig. 7

SPLIT GIB MOUNTING ARRANGEMENT FOR DRILLING COMPONENTS

This application claims the benefit of U.S. Provisional Patent Application Ser. No. 60/584,212, filed Jun. 30, 2004, and U.S. Provisional Patent Application Ser. No. 60/587,741, filed Jul. 14, 2004, the disclosures of which are incorporated herein by reference.

FIELD OF THE INVENTION

The present invention relates generally to the drilling arts and, more particularly, to a split gib mounting arrangement for a component used in drilling a borehole.

BACKGROUND OF THE INVENTION

Modern drills used in forming boreholes in the face of underground mine passages, sometimes referred to as "face" drills, typically include a boom carrying a feed beam supporting a drill head as it reciprocates. To facilitate movement of the drill head in a smooth and efficient manner, replaceable pads formed of a wear resistant, yet lubricious material (e.g., polyurethane) are used for mounting the drill head or other related components (e.g., centralizers) to the feed beam. This not only facilitates the desirable smooth movement, but also maximizes the service life and reduces the maintenance requirements, which in turn decreases operating cost and increases yield.

Many past proposals exist for coupling the wear pads with the supports (or "gibs") for the drill head or like component to the feed beam. One such arrangement requires two wear pads, one positioned along each side of the feed beam associated with a single drilling component. Each wear pad includes a tenon portion, such as a dovetail, corresponding to an elongated, open-ended channel or mortise formed in each of a corresponding pair of supports. Since the dimensions of the dovetail must necessarily be smaller than those of the channel to permit insertion in the longitudinal direction, retainers extending through oblique holes hold the wear pad in place during the rigors of drilling.

U.S. Pat. No. 5,704,716 to Jantunen describes a subsequent, but similar approach and is incorporated herein by reference. The '716 patent discloses a support structure, referred to as a "slide frame," located along each side of a feeding beam. A single channel in each slide frame receives a dovetail formed along a backside of a polyurethane cast slide member. Bolts extend through the slide frames and prevent the slide from moving in the longitudinal direction.

This type of arrangement only allows for insertion of the slide member in a longitudinal direction. Hence, the dimensions of the dovetail must necessarily be smaller than those of the corresponding channel. Otherwise, the allegedly desirable mode of insertion solely in the longitudinal direction could not result.

The need for deliberately undersizing the dovetail or oversizing the corresponding channel to facilitate insertion in a longitudinal direction creates problems in certain drilling applications. For instance, this undersizing or oversizing creates a gap that allows for possible misalignment of the drill head or other supported components. While retainers used in the prior art approaches at least initially help to prevent such longitudinal movement, the possibility of back and forth movement against them remains. Over time, this can lead to tearing or cracking of the wear pad or slide. At a minimum, this creates a need for early and frequent inspection, and if left unchecked could result in a catastrophic failure.

Accordingly, there is a need for an improved mounting arrangement for a drill head or other component associated with a feed beam in a face drill. The arrangement would permit the insertion of a wear pad including a tenon, such as a dovetail, in a corresponding matching channel or mortise in a direction other than the longitudinal direction. This would potentially allow for oversizing the portion of the wear pad received in the channel to ensure that it remains held securely in place and resists tearing or cracking during the rigors of drilling.

SUMMARY OF THE INVENTION

In accordance with a first aspect of the invention, an apparatus for assisting in mounting a wear pad to a drilling machine is disclosed. The apparatus comprises a first elongated gib split longitudinally into at least first and second mating, attached portions. The portions together create a channel (preferably from mutually facing channel portions) for receiving and holding at least a portion of the wear pad against movement in a transverse direction. As a result, the wear pad may be inserted in and removed from the channel in the longitudinal or transverse direction by separating the first and second portions of the gib.

In one embodiment, the portion of the wear pad comprises a tenon and the channel comprises a corresponding mortise. Preferably, the tenon is oversized relative to the mortise, and thus cannot be inserted in or removed from the longitudinal direction without separating the gib portions. Still more preferably, the tenon is a dovetail and the wear pad is generally Y-shaped in cross-section.

The apparatus may further include a fastener for attaching the first and second portions of the gib together. Preferably, the fastener comprises a bolt extending through substantially aligned apertures in the first and second gib portions. The fastener may also pass at least partially through the channel including the portion of the wear pad. Alternatively, the fastener may comprise an end plate for engaging an end face of the wear pad.

Additionally, the apparatus may include a second gib split into at least first and second portions. These portions together creating a second channel for receiving a portion of a second wear pad. The first and second channels of the corresponding gibs may be opposed when the first and second wear pads engage the feed beam and a drill head is positioned on an associated carriage.

In accordance with a second aspect of the invention, a mounting arrangement between a longitudinally arranged feeding beam and at least one component slidable along the feeding beam in a rock drilling machine is disclosed. The mounting arrangement comprises a pair of opposed elongated gibs mounted to the component along opposite sides thereof and split longitudinally into first and second mating portions. The gibs have mutually facing channels formed therein, with each channel having at least two adjacent surfaces oriented at a predetermined angle. A wear pad is secured within each of the channels, with each wear pad having at least two exterior surfaces engaged with the at least two adjacent surfaces of a respective one of the channels. Furthermore, each wear pad and a respective one of the channels also have cooperating surfaces expanding in a direction away from the feeding beam. The feeding beam is provided with angled slide surfaces along opposite side edges thereof and the wear pads each have a groove facing the feeding beam and in surface engagement with the angled slide surfaces along the opposite side edges thereof.

In one embodiment, the mounting arrangement further comprises a fastener for fastening the first and second mating portions of each gib together. Preferably in this embodiment, the at least two exterior surfaces of each wear pad also form a dovetail. At least one retainer may also be provided for retaining each wear pad in the corresponding channel.

In accordance with a third aspect of the invention, a method for associating a wear pad with an elongated gib split longitudinally into first and second mating portions for intended use in a drilling machine is disclosed. The method comprises associating the wear pad with a first portion of a first channel formed in a first portion of the split gib. The method further comprises mating a second portion of the split gib with the first portion.

The method may further include the step of providing the second portion of the split gib with a second channel matching the first channel. Furthermore, the associating step comprises moving the wear pad into the first or second channel in the longitudinal direction. Alternatively, the associating step may comprise moving the wear pad into the first or second channel in a direction transverse to a longitudinal direction. The mating step may also comprise contacting a first planar surface of the first gib portion with a matching surface of the second gib portion.

In accordance with a fourth aspect of the invention, a method of manufacturing an elongated gib including an elongated channel sized for receiving a portion of a wear pad for engaging a feed beam in a rock drilling machine is disclosed. The method comprises: (1) cutting the elongated gib longitudinally along the channel to form first and second mating portions; and (2) attaching the first portion of the gib to the second portion with the portion of the wear pad in the channel. The cutting step removes material from the gib and causes the portion of the wear pad to become oversized relative to the channel such that movement of the wear pad in the longitudinal direction is resisted.

The following description depicts and describes one possible embodiment of this invention, simply by way of illustration of one of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1a is a side view of a drilling machine;

FIG. 1b is a detailed view of a boom, feed beam and drill head of the drilling machine of FIG. 1a;

FIG. 5 is a bottom view of the gib of FIG. 4;

FIG. 7 is a partial end view of the gib of FIG. 4.

DETAILED DESCRIPTION OF THE INVENTION

FIGS. 1a and 1b illustrate one embodiment of a drilling machine D for forming boreholes, such as in a face (e.g., roof, wall, or floor) of an underground mine passage. As is customary, such a face drill D may comprise a wheeled support vehicle V for moving to and fro about the mine, as well as at least one articulating boom B supporting a drill head H. An operator's cab O includes various controls for moving the vehicle V and actuating both the drill head H and boom B in the desired fashion.

Turning more specifically to FIG. 1b, the boom B carries an elongated feed or feeding beam F. This beam F in turn supports the drill head H and other components (e.g., traveling drill guides or stabilizers Q, which are sometimes referred to in the vernacular as "centralizers") for assisting in moving a drilling element E (or "steel") to and fro in a longitudinal direction during formation of the borehole. Movement of the drill head H, and thus the drilling element E, toward and away from the face (as indicated by the double-headed action arrow A in FIG. 1a) may result from the actuation of a large diameter hydraulic feed cylinder associated with a cable and pulley system. The drill head H, sometimes referred to as a "hammer," preferably supplies both a rotary and a percussive force to the drilling element E to form the borehole in the most efficient and effective manner.

Figure 2:
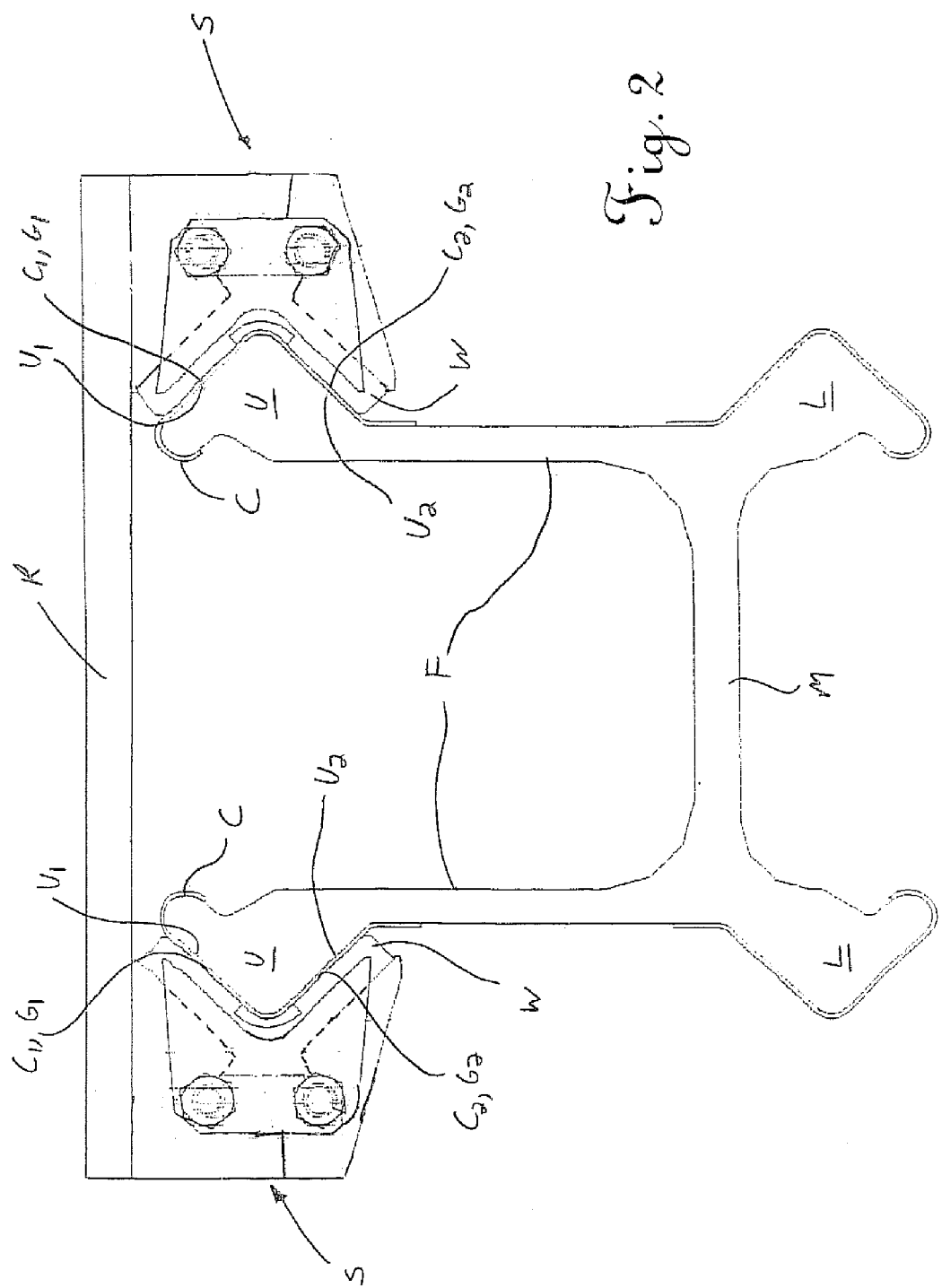
FIG. 2 is a cross section of a typical feed beam.

FIG. 2 illustrates a typical feed beam F in cross section. This beam F includes upper, outwardly projecting portions U or legs adapted for receiving and supporting a carriage R for the drill head H or other drilling component. Optional, similarly shaped lower portions L may extend in a direction opposite the upper portions U. A transverse cross member M gives the feed beam F a generally "H-shaped" cross-section. Preferably, the feed beam F comprises a single, one piece aluminum extrusion, which makes it both lightweight and rigid. Cutouts (not shown) formed along the extrusion serve not only to reduce further its weight, but also to prevent any build up of drill cuttings, as known in the art.

In the illustrated embodiment, at least the upper portions U of the feed beam F include generally opposed slide surfaces $U_1$, $U_2$. These surfaces $U_1$, $U_2$ converge at an angle in a direction away from the feed beam F for engaging corresponding surfaces of a wear pad W associated with a support S for a drill component, such as the drill head H. Stainless steel covers C preferably protect the surfaces of the feed beam F against wear, and thus create intermediate wear surfaces $C_1$, $C_2$. An example of one type of such a cover C may be found in U.S. Pat. No. 4,682,899 to Andersson et al., the disclosure of which is herein incorporated by reference.

Figure 3:
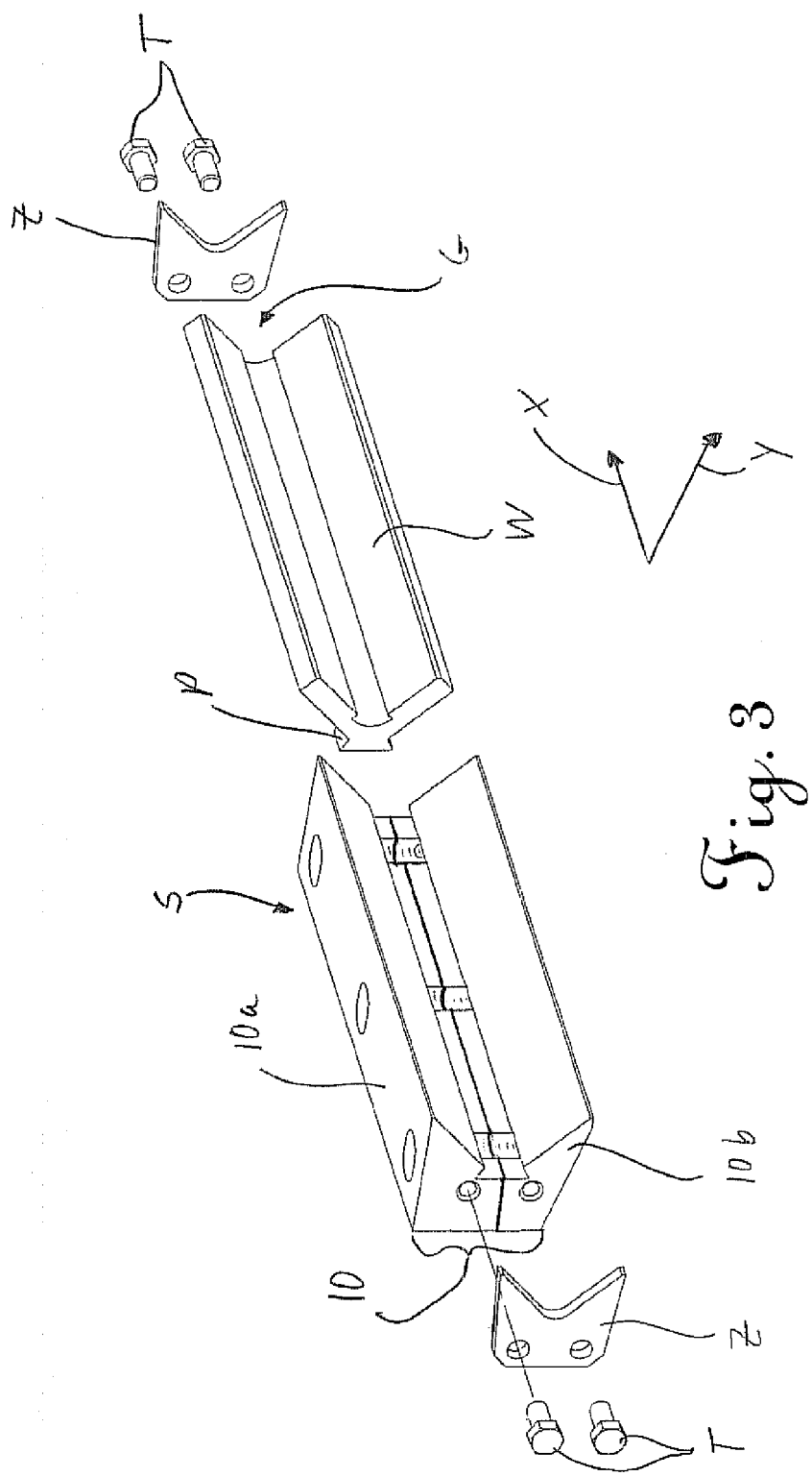
FIG. 3 is a partially exploded perspective view of one embodiment of the mounting arrangement forming one aspect of the present invention.
Figure 4:
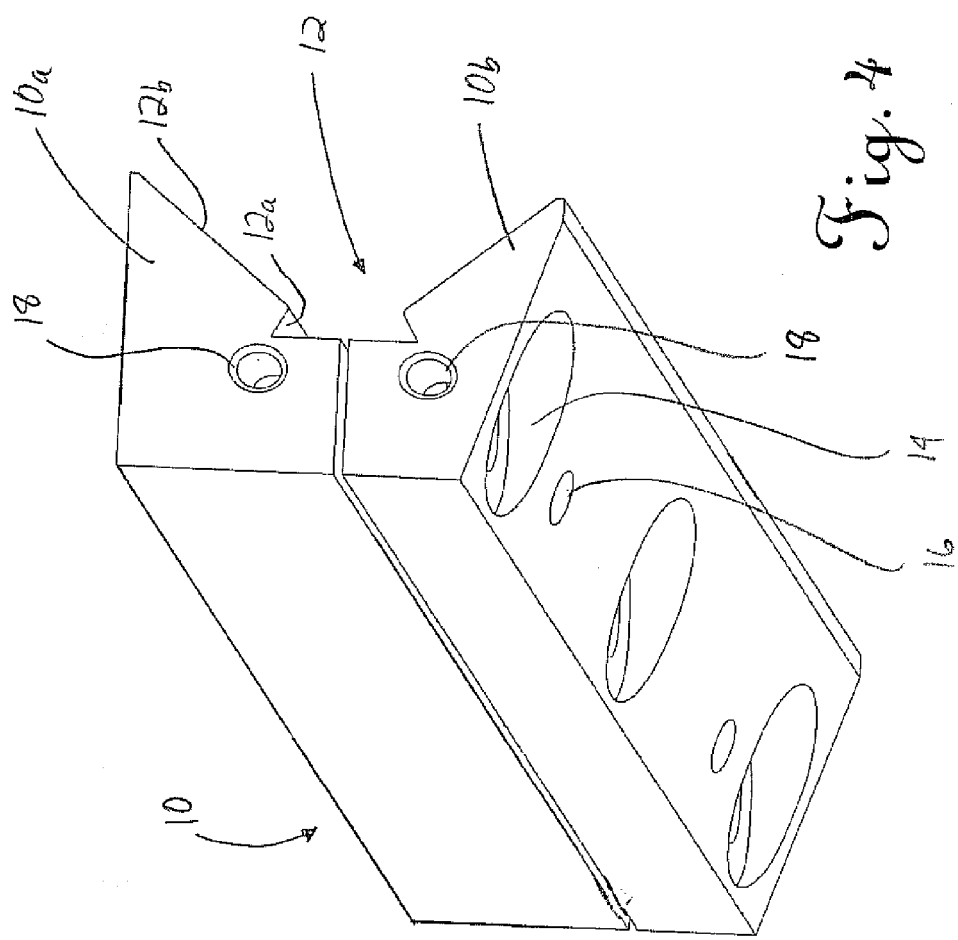
FIG. 4 is a detailed perspective view of one embodiment of a split gib forming another aspect of the invention.

In accordance with one aspect of the invention, and as shown in FIGS. 3 and 4, the mounting arrangement or support S for the drill component(s) comprises an elongated gib 10 split longitudinally into at least two mating, but attached portions 10a, 10b, one of which associates with the carriage R, a cradle, or other adjacent structure. As shown in FIGS. 3 and 4, the mating portions 10a, 10b together form an elongated groove or channel 12. The wear pad W in turn is Y-shaped in cross-section and thus includes a portion P along one side (hereinafter referred to as the "backside") adapted for insertion in the channel 12 in a manner outlined in the following description. Opposite the backside portion P of the wear pad W is a groove G including wear surfaces $G_1$, $G_2$. This groove G receives the upper portion U of the feed beam F along one side, thus establishing engagement between the corresponding wear surfaces $C_1$, $C_2$; $G_1$, $G_2$ (see FIG. 2).

Before describing the overall assembly sequence, a more detailed description of one possible embodiment of the split gib 10 is provided. With reference to FIGS. 4 and 5, the gib portions 10a, 10b include a plurality of openings or apertures that align upon assembly to form passages. At least one of the passages 14 receives an optional fastener or retainer, such as a bolt 15, passing at least partially through the channel 12 (see FIG. 3 and the cross section provided in FIG. 6a). To accommodate this bolt 15 in the channel 12, the backside portion P of the wear pad W may include corresponding cut-outs or scallops (not shown, but see FIG. 3 of the '716 patent).

In addition to engaging the wear pad W, the bolt 15 extending through at least one of the passages 14 may secure the carriage R to the first portion 10a of the gib 10 (that is, the upper portion shown in FIGS. 4a, 6a, and 6b), or other means may secure the two structures together (e.g., welding). One or more of the bolts 15 passing through the passages 14 may also extend into the drill head H or other components to assist in securing them in place.

Figure 6B:
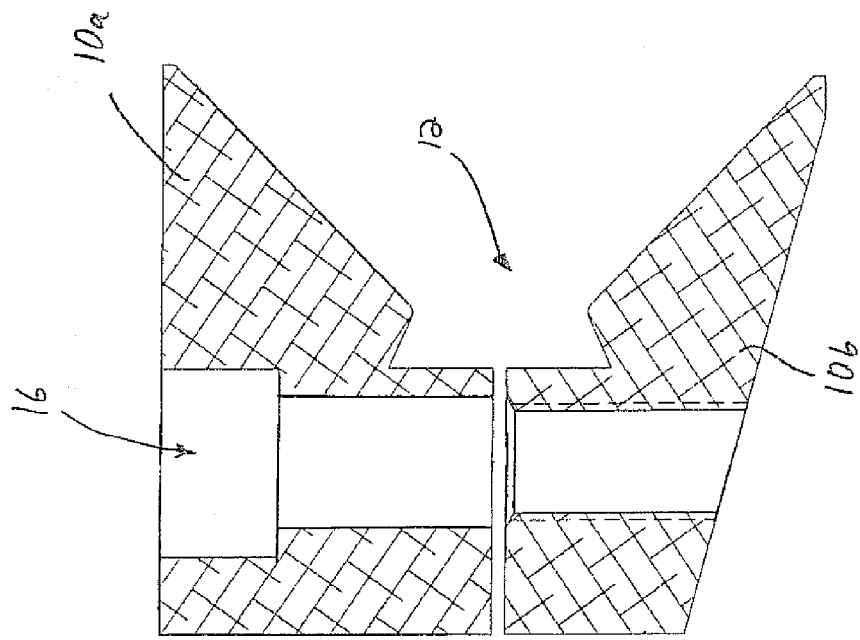
FIG. 6b is a cross-sectional view taken along the line 6b-6b of FIG. 5.
Figure 6A:
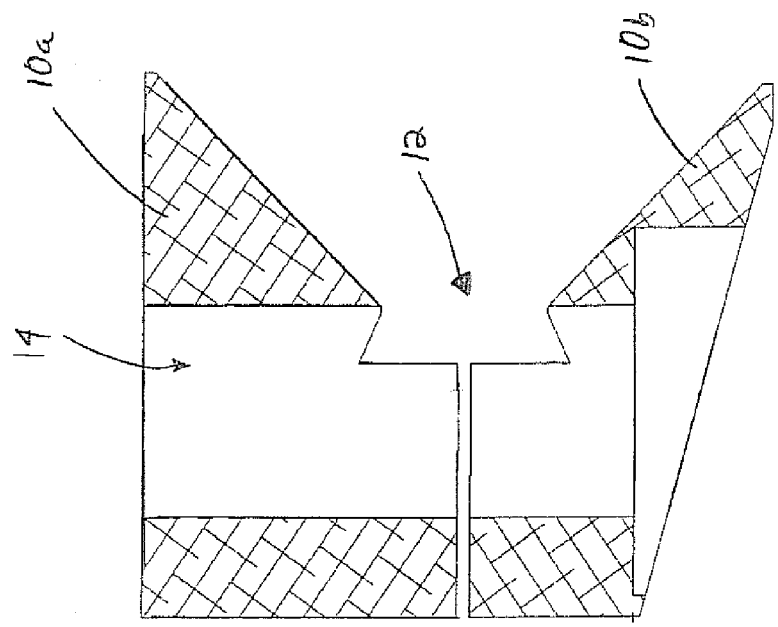
FIG. 6a is cross-sectional view taken along the line 6a-6a of FIG. 5.

Additionally, the gib 10 may include at least one other passage 16 for receiving a fastener or retainer, such as the bolt 17 shown in FIG. 4. This bolt 17 secures the two gib portions 10a, 10b together when mated, independent of the retainer in passage 14. As shown in FIGS. 6a and 6b, countersinks in the ends of the passages 14, 16 accommodate the particular retainer or fastener used in the desired fashion (e.g., a nut and bolt combination), and facilitate release when necessary.

Typically, the gib 10 includes a plurality of each type of passage 14, 16 so as to permit use of multiple retainers and fasteners and ensure that a reliable, secure connection is established. FIG. 5 depicts one possible arrangement in which the gib 10 includes three passages 14 for retainers and two passages 16 for fasteners. However, the particular number of each passage 14, 16 provided may depend on factors such as the length of the gib 10 in the longitudinal (X) direction or the particular requirements of a drilling operation, and thus may vary.

As shown in FIGS. 3 and 4, each portion 10a, 10b of the gib 10 may also include opposed openings 18 formed in each end. These openings 18 may align with a longitudinal (X) direction for receiving threaded fasteners, such as bolts T, for securing a different type of fastener or retainer in the form of end plates Z to the gib 10. Besides assisting in securing the gib portions 10a, 10b together, these end plates Z also help to prevent the wear pad W from moving in the longitudinal (X) direction relative to the gib 10 as the drill component (such as drill head H) traverses to and fro during drilling or otherwise.

With final respect to the gib 10 per se, and as briefly noted in the prior discussion, each portion 10a, 10b defines at least part of the channel 12. As shown in FIG. 7 (in which the gib 10 is reoriented for purposes of convenience), the first and second portions 10a, 10b split longitudinally along a transverse line N, which may divide the channel 12 in two generally symmetrical portions. In the preferred arrangement where the backside portion P of the corresponding wear pad W comprises a tenon in the form of a dovetail, the innermost portion of the channel 12 adapted for receiving it creates a corresponding mortise (e.g., a recess including outwardly divergent, opposed sidewalls). In other words, this portion includes opposed angled sidewalls 12b, positioned at an angle $\alpha$ (which may be about 65°), with adjacent and opposed surfaces 12a that match corresponding surfaces of the dovetail formed in the backside portion P of the wear pad W (which is thus also symmetrical about the dividing line N).

The channel 12 also includes an outer portion with outwardly divergent opposed sidewalls 12c. These walls 12c are adapted for engaging corresponding surfaces of the wear pad W when the backside portion P resides in the channel 12. These opposed walls may form an angle $\theta$ with each other of approximately 90°. The wall of the first gib portion 10a may also form an included angle of approximately 45° with the adjacent planar surface adapted to mate with the carriage R.

A description of the assembly of the mounting arrangement including the split gib 10 is now provided. The backside portion P of the wear pad W inserts in that part of the channel 12 associated with one gib portion, such as the second gib portion 10b, either in the longitudinal (X) direction or a direction substantially transverse to the longitudinal direction (e.g., the Y direction). The first gib portion 10a then mates with the second portion 10b including the wear pad W, and any fasteners and retainers are put in place. As noted above, scallops in the backside portion P of the wear pad W may accommodate any portion of the retainer, such as bolt 17, extending into the channel 12. This further helps to immobilize the wear pad W in the longitudinal direction.

When using this assembly sequence, it should be appreciated that the projecting backside portion P of the wear pad W (e.g., the dovetail or other type of tenon) received in the channel 12 created by the mated gib portions 10a, 10b may be oversized, as compared to an arrangement requiring insertion in the longitudinal direction only. As a result, frictional engagement prevents movement in the longitudinal (X) direction. Combined with the secure fastening together of the gib portions 10a, 10b, the oversized nature of this portion of the wear pad W serves to hold it securely in place against movement with the bolts 15, 17 and end plates Z if present providing an additional safeguard (see FIGS. 3 and 7).

As a result of the tight seating engagement created, the incidence of tearing and cracking of the wear pad is reduced. This increases the service life of the mounting arrangement. Ultimately, a reduction in the need for frequent inspection results, which leads to less maintenance cost.

When splitting of the gib 10 is done longitudinally along the channel 12 with material removal (e.g., cutting), this automatically causes any existing tenon regularly sized to slide longitudinally therein to be oversized relative to the corresponding mortise such that movement in the longitudinal (X) direction is resisted. The two portions 10a, 10b created may simply be mated as described above and attached together, such as through releasable fasteners or even a more permanent form of attachment (e.g., spot welding). Retrofitting existing gibs using this technique is also possible without significant effort.

Once assembled with the carriage R, the support S including the split gib 10 with mutually opposing channels 12 and wear pad W with mutually opposing grooves G (see FIG. 2) may be associated with the feed beam F. One manner of accomplishing this association is by sliding the resulting assembly over the upper portions U of the feed beam F (or the lower portions L, if applicable) in the longitudinal direction. Alternatively, the split nature of the gib 10 may enable removing one portion (such as the second or lower portion 10b in the arrangement shown in FIG. 1) while the associated structure (e.g., carriage R) remains associated with the feed beam F. This may allow for removal of the other portion and associated structure (carriage, drilling component, etc.) in a direction transverse to the longitudinal direction (e.g., vertically). As should be appreciated, the ability to effect removal in this fashion depends in large part on the flexibility of the wear pad W used.

In some instances, the tight seating engagement created by oversizing the backside portion P of the wear pad W received in the mating channel 12 is unnecessary. Such an arrangement may advantageously permit insertion of the wear pad W in the longitudinal direction as well, such as after securing the gib portions 10a, 10b together. The ability to insert a wear pad W with a dovetail or similar tenon in a mating channel 12 in two different directions nevertheless remains an advantage not found in prior art mounting arrangements employing one piece gibs. However, due consideration must be given to the potential problems with such an arrangement, which may make it unsuitable for certain applications or increase the operating cost.

Despite an overall preference for using a dovetail as the tenon and a matching channel as the mortise, an important consideration is that the wear pad W remains firmly held between the gib portions 10a, 10b when mated, and cannot move in at least a direction transverse to the longitudinal direction. As long as this function results, any type of mortise and tenon, tongue and groove, or like type of arrangement will work. Regardless of the arrangement used, the ability to separate the gib portions 10a, 10b from each other would still allow for the insertion and withdrawal of the wear pad W in a direction other than the longitudinal one.

Finally, the gib 10 may be fabricated by machining the channel 12 and passages 14, 16, 18 in a single block of material, such as 6061-T6 Aluminum. This block may then be cut along a dividing line, such as the one shown in FIG. 7, to create the separable portions 10a, 10b. An alternative approach involves forming the gib portions 10a, 10b separately from different pieces of material. In either case, the portions 10a, 10b may be symmetrical in cross section about the dividing line or non-symmetrical, as illustrated in FIG. 4.

The foregoing description of the invention is presented for purposes of illustration and description. It is not intended to be exhaustive or to limit the invention to the precise form disclosed. Obvious modifications or variations are possible in light of the above teachings. For example, other embodiments may not include retainers, but instead may rely merely on the gib portions 10a, 10b to retain the wear pad W. The embodiments described herein provide the best illustration of the principles of the invention and its practical application to thereby enable one of ordinary skill in the art to utilize the invention in various embodiments and with various modifications as are suited to the particular use contemplated.

The invention claimed is:

1. An apparatus for assisting in mounting a wear pad to a drilling machine, comprising:
    a first elongated gib split longitudinally into at least first and second mating portions that are attached together to create an elongated channel for receiving and holding at least a portion of the wear pad against movement in a transverse direction;
    wherein the portion of the wear pad includes a tenon comprising a dovetail and the channel comprises a corresponding mortise, wherein the tenon is oversized relative to the mortise to resist movement in the longitudinal direction;
    whereby the wear pad may be inserted in and removed from the channel in the longitudinal or transverse direction by separating the first and second portions of the gib.

2. The apparatus according to claim 1, wherein the wear pad is generally Y-shaped in cross-section.

3. The apparatus according to claim 1, further including a fastener for attaching the first and second portions of the gib together.

4. The apparatus according to claim 3, wherein the fastener comprises a bolt extending through substantially aligned apertures in the first and second portions of the gib.

5. The apparatus according to claim 3, wherein the fastener comprises a bolt passing transversely through the first and second gib portions and at least partially through the channel including the portion of the wear pad.

6. The apparatus according to claim 3, wherein the fastener comprises an end plate for engaging an end of the wear pad.

7. The apparatus according to claim 1, further including a second gib split into at least first and second portions together creating a second channel for receiving a portion of a second wear pad, the first and second channels being opposed.

8. The apparatus according to claim 1, her comprising a drill head positioned on a carriage attached to one of the first and second portions of the first gib.

9. The apparatus according to claim 1, wherein a first portion of the channel is formed in the first gib portion and a second portion of the channel is formed in the second gib portion, and the first and second channel portions are mutually facing when the first and second gib portions are attached together.

10. In a rock drilling machine, a mounting arrangement between a longitudinally arranged feeding beam and at least one component slidable along the feed beam, the arrangement comprising:
    a pair of opposed elongated gibs mounted to the component along opposite sides thereof and split longitudinally into first and second mating portions, the gibs having mutually facing channels formed therein, each channel having at least two adjacent surfaces oriented at a predetermined angle; and
    a wear pad secured within each of the channels, each wear pad having at least two exterior surfaces engaged with the at least two adjacent surfaces of a respective one of the channels, each wear pad and a respective one of the channels also having cooperating surfaces expanding in a direction away from the feeding beam;
    wherein the feeding beam is provided with angled slide surfaces along opposite side edges thereof and the wear pads each have a groove facing the feeding beam and in surface engagement with the angled slide surfaces along the opposite side edges of the feeding beam.

11. The mounting arrangement of claim 10, further comprising a fastener for fastening the first and second mating portions of each gib together.

12. The mounting arrangement of claim 10, wherein the at least two exterior surfaces of each wear pad form a dovetail.

13. The mounting arrangement of claim 10, further comprising at least one retainer for retaining the wear pad in the channels.

14. An apparatus for intended use in assisting in mounting a drill to a drilling machine, comprising:
    a wear pad having a generally Y-shaped cross-section;
    a first elongated gib split longitudinally into at least first and second mating portions that are attached together to create an elongated channel for receiving and holding at least a portion of the wear pad against movement in a transverse direction;
    whereby the wear pad may be inserted in and removed from the channel in the longitudinal or transverse direction by separating the first and second portions of the gib.

15. An apparatus for assisting in mounting a wear pad to a drilling machine, comprising:
    a first elongated gib split longitudinally into at least first and second mating portions that are attached together to create an elongated channel for receiving and holding at least a portion of the wear pad against movement in a transverse direction; and
    a fastener for attaching the first and second portions of the gib together, said fastener comprising a bolt passing transversely through the first and second gib portions and at least partially through the channel including the portion of the wear pad, whereby the wear pad may be inserted in and removed from the channel in the longitudinal or transverse direction by separating the first and second portions of the gib.

16. An apparatus for assisting in mounting a wear pad to a drilling machine, comprising:

a first elongated gib split longitudinally into at least first and second mating portions that are attached together to create an elongated channel for receiving and holding at least a portion of the wear pad against movement in a transverse direction; and a fastener for attaching the first and second portions of the gib together, said fastener comprising an end plate for engaging an end of the wear pad;

whereby the wear pad may be inserted in and removed from the channel in the longitudinal or transverse direction by separating the first and second portions of the gib.

\* \* \* \* \*

UNITED STATES PATENT AND TRADEMARK OFFICE
CERTIFICATE OF CORRECTION

| | | |
|---|---|---|
| PATENT NO. | : 7,371,009 B1 | Page 1 of 1 |
| APPLICATION NO. | : 11/167328 | |
| DATED | : May 13, 2008 | |
| INVENTOR(S) | : Timothy D. Burgess et al. | |

It is certified that error appears in the above-identified patent and that said Letters Patent is hereby corrected as shown below:

Claim 8, column 8, line 6, please replace "her" with -- further --.

Signed and Sealed this

Twenty-ninth Day of July, 2008

JON W. DUDAS
*Director of the United States Patent and Trademark Office*